(12) United States Patent
Yoon

(10) Patent No.: US 7,769,418 B2
(45) Date of Patent: Aug. 3, 2010

(54) REINFORCING APPARATUS FOR MOBILE PHONE

(75) Inventor: Yoo-Seok Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 517 days.

(21) Appl. No.: 11/758,209

(22) Filed: Jun. 5, 2007

(65) Prior Publication Data

US 2008/0102909 A1    May 1, 2008

(30) Foreign Application Priority Data

Oct. 31, 2006   (KR)   ...................... 10-2006-0106380

(51) Int. Cl.
*H04M 1/00* (2006.01)
(52) U.S. Cl. .............. 455/575.8; 455/575.1; 455/575.3; 361/679.01; 361/679.04; 361/679.06
(58) Field of Classification Search ......................... 361/679.01–679.61; 455/7.1, 90.3, 309.1–316.8, 455/347, 575.1–575.9
See application file for complete search history.

(56) References Cited

U.S. PATENT DOCUMENTS

| | | | |
|---|---|---|---|
| 7,050,293 B2 * | 5/2006 | Arbisi et al. ............. | 361/679.3 |
| 7,155,266 B2 * | 12/2006 | Stefansen ................ | 455/575.3 |
| 2004/0212956 A1 * | 10/2004 | Kuivas et al. ............... | 361/683 |
| 2004/0266496 A1 * | 12/2004 | Kauhaniemi et al. ...... | 455/575.1 |
| 2005/0266901 A1 * | 12/2005 | Pan .......................... | 455/575.3 |
| 2006/0146488 A1 * | 7/2006 | Kimmel ..................... | 361/681 |
| 2006/0238968 A1 * | 10/2006 | Maatta et al. ............... | 361/683 |
| 2006/0238970 A1 * | 10/2006 | Ukonaho et al. ............ | 361/683 |
| 2007/0032105 A1 * | 2/2007 | Lee et al. .................... | 439/100 |

FOREIGN PATENT DOCUMENTS

KR    10-2006-0055892 A    5/2006

* cited by examiner

*Primary Examiner*—Kent Chang
*Assistant Examiner*—Kashif Siddiqui
(74) *Attorney, Agent, or Firm*—Jefferson IP Law, LLP

(57) ABSTRACT

A reinforcing apparatus for a housing of a bar-type mobile phone is provided to allow the housing to bend and straighten. The mobile phone includes a first housing having a liquid crystal display and a second housing having a key pad. The apparatus includes a first reinforcing member in the first housing, a second reinforcing member in the second housing, and a reinforcing connector that couples the first and second reinforcing members to each other and connects the first and second housings so that they may be bent or straightened with respect to one another. This configuration minimizes damage caused by dropping the phone.

20 Claims, 10 Drawing Sheets

REINFORCING APPARATUS FOR MOBILE PHONE

PRIORITY

This application claims the benefit under 35 U.S.C. §119 (a) of a Korean patent application filed in the Korean Industrial Property Office on Oct. 31, 2006 and assigned Serial No. 2006-106380, the entire disclosure of which is hereby incorporated by reference.

BACKGROUND OF THE INVENTION

1. Field of the Invention

The present invention relates to mobile phones, such as cellular phones, Personal Digital Assistants (PDAs), Hand Held Phones (HHPs), TV Phones for viewing Digital Multimedia Broadcasting (DMB) content, gaming phones, message transmission phones and the like. More particularly, the present invention relates to a reinforcing apparatus for a mobile phone.

2. Description of the Related Art

Generally, a mobile phone is a portable device that allows a user to receive and place telephone calls. One example of a mobile phone is a portable terminal, which is an apparatus that allows a user to perform radio communication with others while carrying the apparatus. Examples of portable terminals include Hand Held Phones (HHPs), cellular phones, PCS phones, PDAs and the like.

Portable terminals may be classified into diverse types according to their external shape. For example, a portable terminal may be classified as a bar-type, a flip-type, or a folder-type portable terminal. A bar-type terminal has a single housing that is shaped like a bar. A flip-type terminal has a cover that is rotatably attached to a bar-type housing by a hinge device. A folder-type has a folder that is rotatably and foldably connected to a single bar-type housing. These types of conventional portable terminals include an antenna unit, a data input/out unit, and a data transmitting/receiving unit. Typically, the data input unit uses key buttons through which a user inputs data by finger pressing. A touch pad or a touch screen may also be used.

The key buttons may be used to exchange messages.

Generally, the key buttons for data input are arranged with a plurality of key arrays. The keys include a sending key, a cancelling key, a clearing key, number keys, character keys, an ending key, a function key, a power key, and the like.

In a bar-type terminal, as shown in FIGS. 1 and 2, a single housing 1 has a liquid crystal display (LCD) 2 and a speaker unit 4 on the upper end, and a key pad 3 and a microphone 5 on the lower end.

Since a bar-type terminal includes the above-mentioned components in a single housing, the thickness and the length of the terminal are large. The large size increases the likelihood of breakage while being held by a user or while being carried in a user's pocket.

In addition, if the terminal is dropped, the housing may be broken and damaged due to impact shocks.

SUMMARY OF THE INVENTION

An aspect of the present invention is to address the above problems and/or disadvantages and to provide at least the advantages described below. Accordingly, an aspect of the present invention is to provide a reinforcing apparatus for a mobile phone, in which a housing of a bar-type phone is configured so as to be capable of being bent or straightened, thereby reducing the possibility of the phone being broken.

Another aspect of the present invention is to provide a reinforcing apparatus for a mobile phone, in which a housing of a bar-type phone is configured to be capable of being bent or straightened, thereby improving the portability of the phone with its flexibility upon being carried by a user.

Still another aspect of the present invention is to provide a reinforcing apparatus for a mobile phone, in which a housing of a bar-type phone is configured to be capable of being bent or straightened, thereby absorbing impact shocks and reducing the possibility of the phone being damaged when dropped.

In accordance with an aspect of the present invention, a reinforcing apparatus for a mobile phone including a first housing having a liquid crystal display and a second housing having a key pad is provided. The reinforcing apparatus includes a first reinforcing member in the first housing, a second reinforcing member in the second housing, and a reinforcing connector coupling the first and second reinforcing members to each other so that they face each other. The reinforcing connector connects the first and second housings so that they are capable of being bent or straightened with respect to each other.

BRIEF DESCRIPTION OF THE DRAWINGS

The above and other aspects, features and advantages of the present invention will be more apparent from the following detailed description of certain exemplary embodiments taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
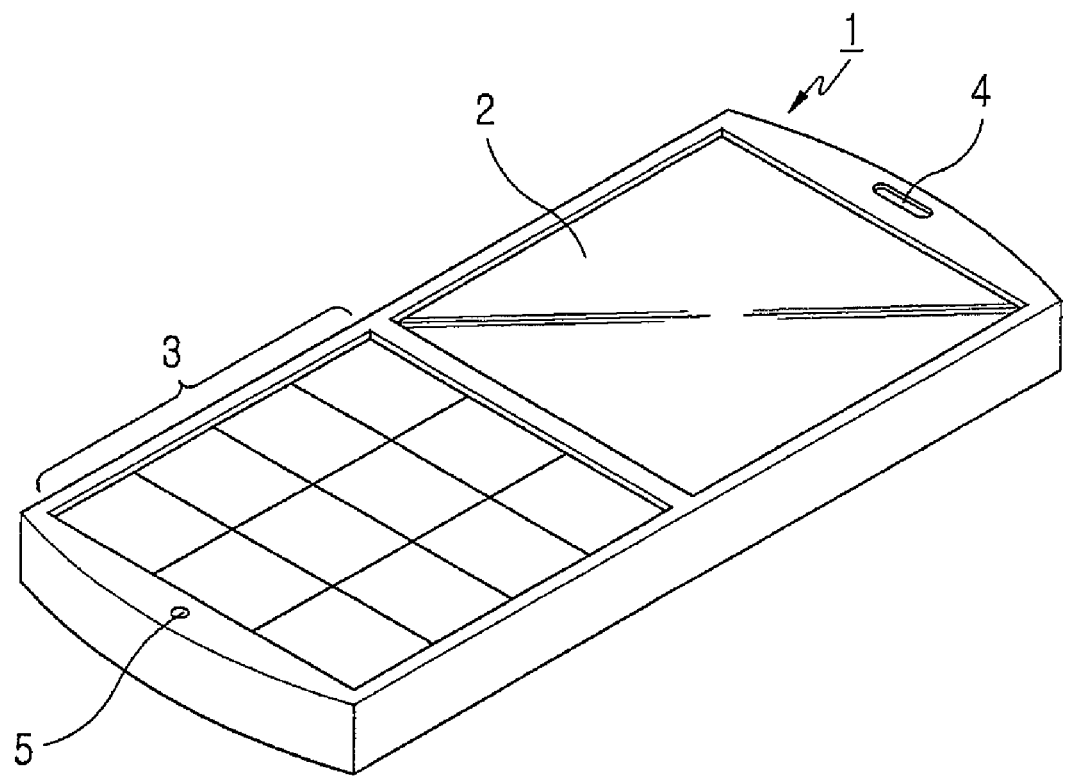
FIG. 1 is a perspective view of a conventional bar-type mobile phone.
Figure 2:
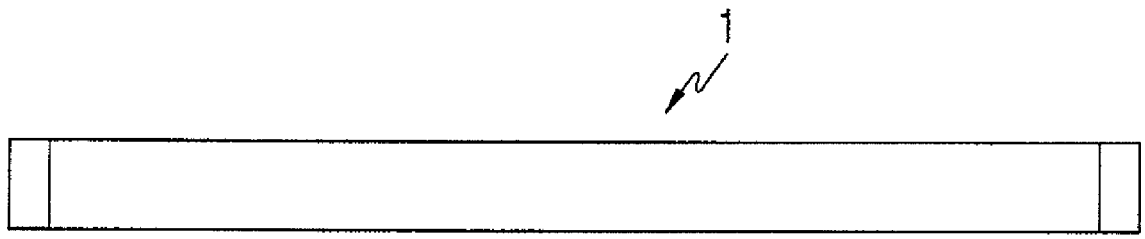
FIG. 2 is a side view of the conventional bar-type mobile terminal illustrated in FIG. 1.
Figure 3:
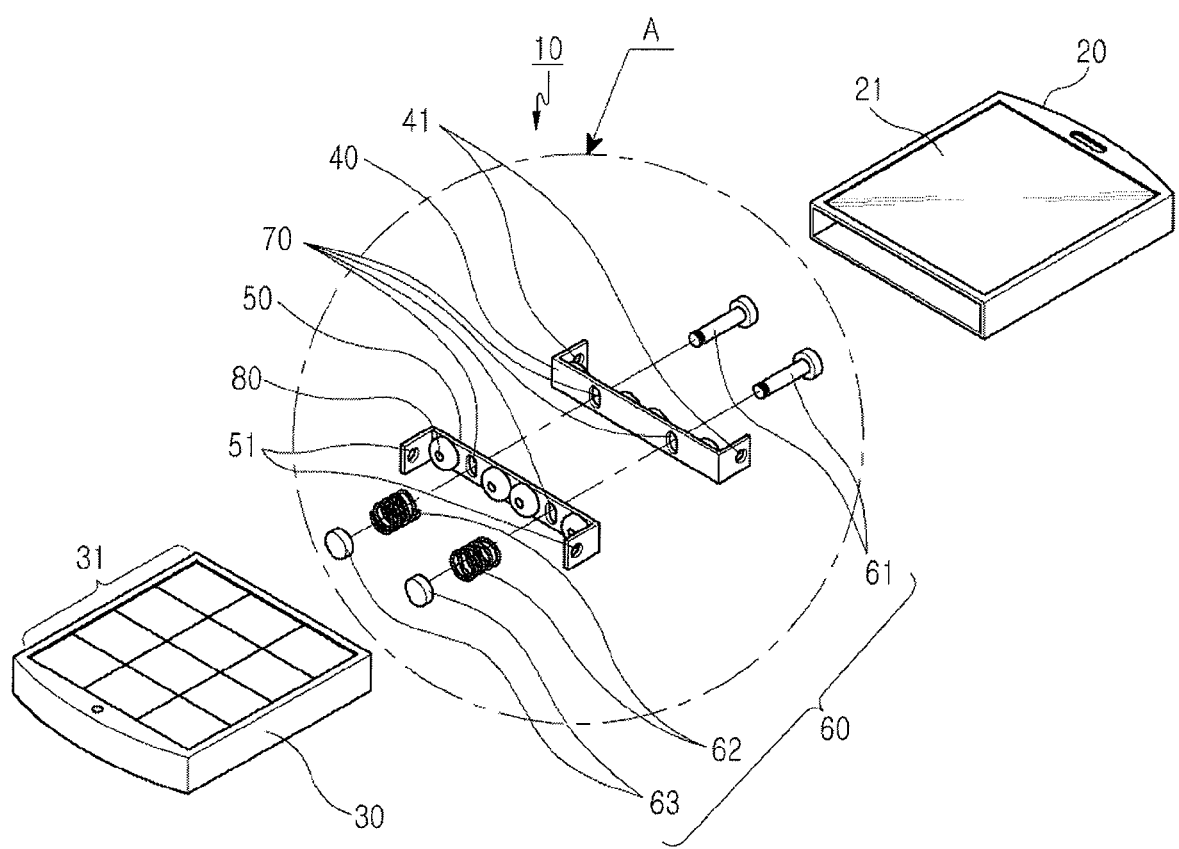
FIG. 3 is an exploded perspective view of a mobile phone with a reinforcing apparatus according to an exemplary embodiment of the present invention.

As illustrated in FIG. 3, a mobile phone includes a first housing 20 having a liquid crystal display (LCD) 21, and a second housing 30 having a key pad 31.

Figure 4:
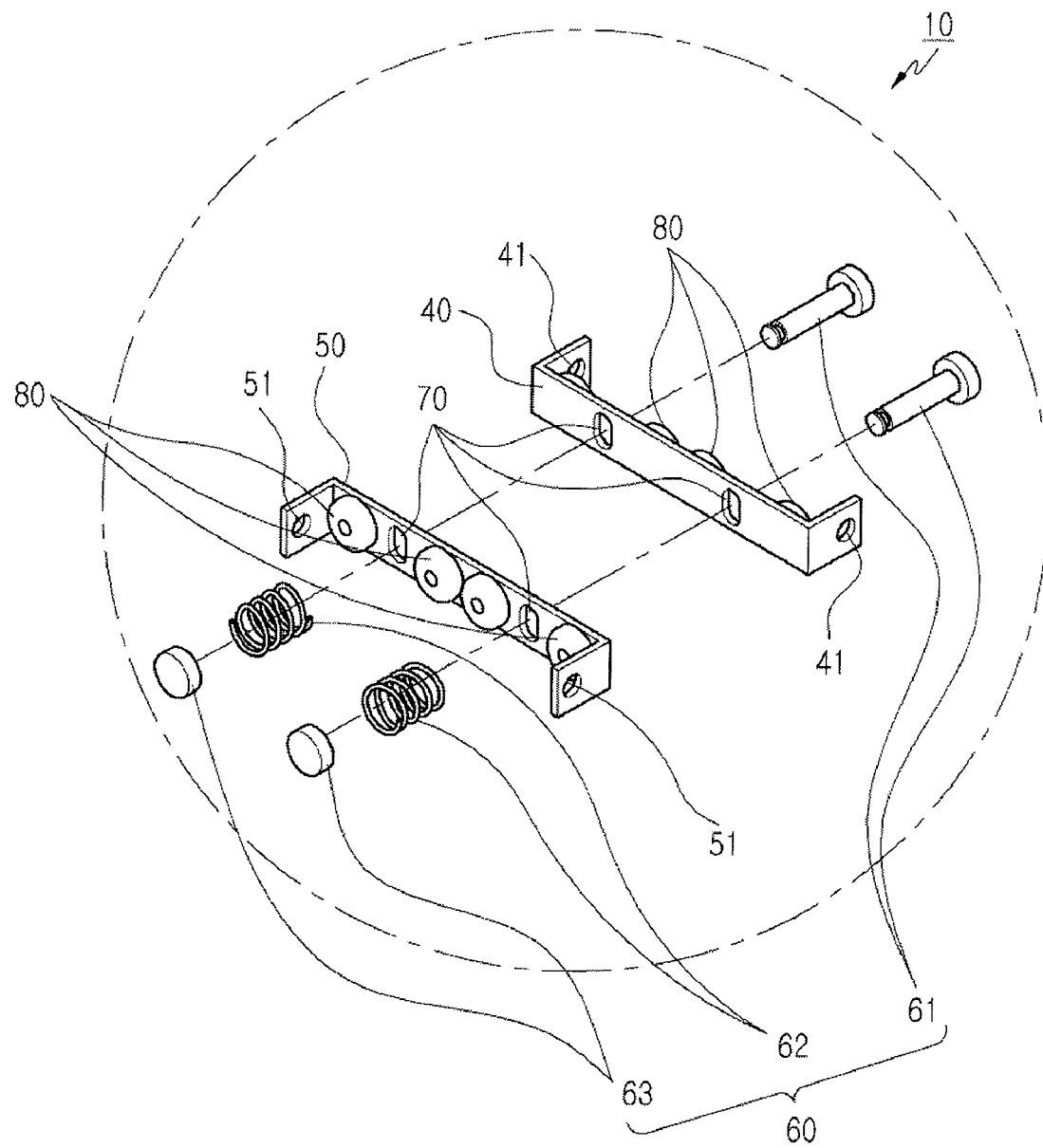
FIG. 4 is an enlarged exploded perspective view of the portion "A" of FIG. 3.

Referring to FIGS. 3 and 4, a reinforcing apparatus 10 for the mobile phone includes first and second reinforcing members 40 and 50 and a reinforcing connector 60. The first reinforcing member 40 is provided in the first housing 20 so that it faces and is coupled with the second reinforcing member 50. The second reinforcing member 50 is provided in the second housing 30 so that it faces and is coupled with the first reinforcing member 40. The reinforcing connector 60 is fastened to the first and second reinforcing members 40 and 50 to couple the first and second reinforcing members 40 and 50 together so that they face each other and to connect the first and second housings 20 and 30 together so that they are capable of being bent and straightened with respect to one another.

Figure 5:
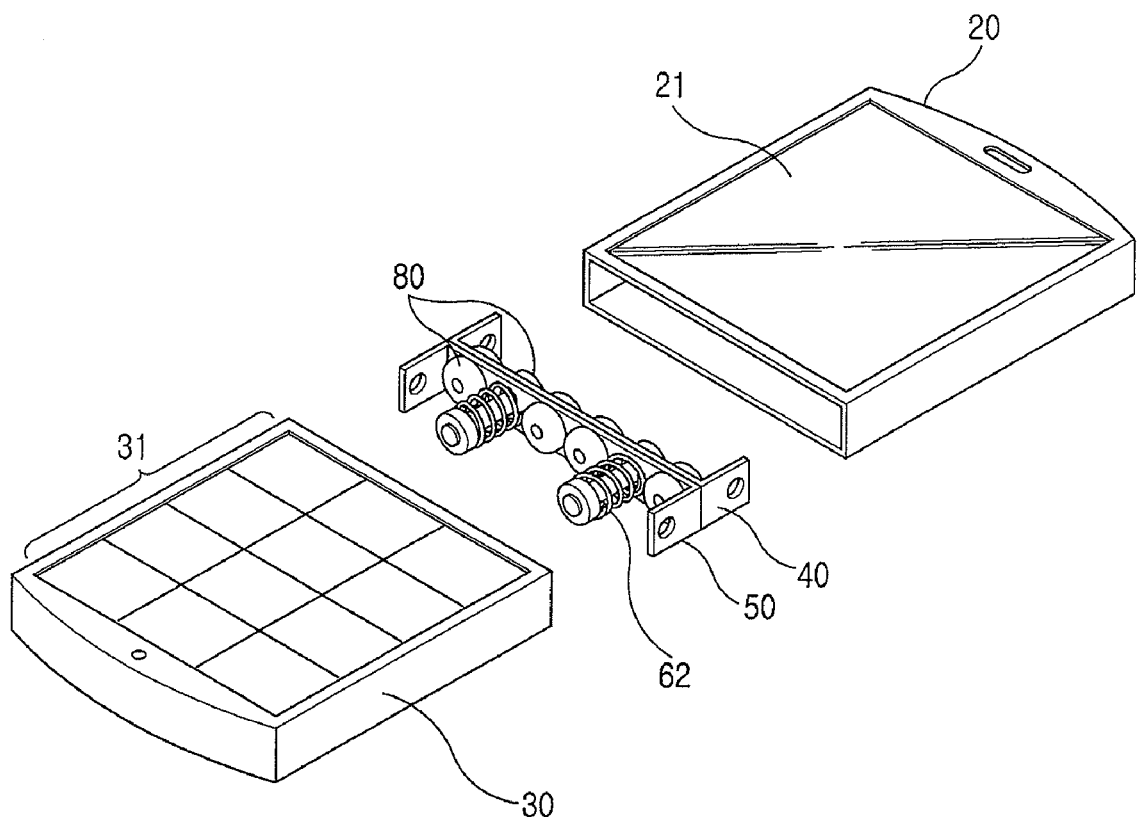
FIG. 5 is a perspective view of the mobile phone illustrated in FIG. 3, before the reinforcing apparatus is installed.

As illustrated in FIGS. 3, 4 and 5, the first and second reinforcing members 40 and 50 are provided, on their opposite ends, with a pair of fastening holes 41 and 51 for fastening the first and second housings 20 and 30. Also, the first and second reinforcing members 40 and 50 are provided, on their middle portions between the opposite ends, with at least one support member 80 for supporting the reinforcing members 40 and 50 and improving reinforcing force.

Referring to FIGS. 3, 4, 8, 9, and 10, the reinforcing connector 60 includes at least one connecting shaft 61, at least one resilient member 62, and at least one snap ring 63. The connecting shaft 61 passes through the middle portions of the first and second reinforcing members 40 and 50 so as to couple them to each other. The resilient member 62 is provided on the connecting shaft 61 that passes through the first and second reinforcing members 40 and 50 so that it provides a resilient force such that it supports the first and second reinforcing members 40 and 50 and bends or straightens the first and second housings 20 and 30. The snap ring 63 is fastened to an end of the connecting shaft 61 to support the resilient member 62.

Figure 10:
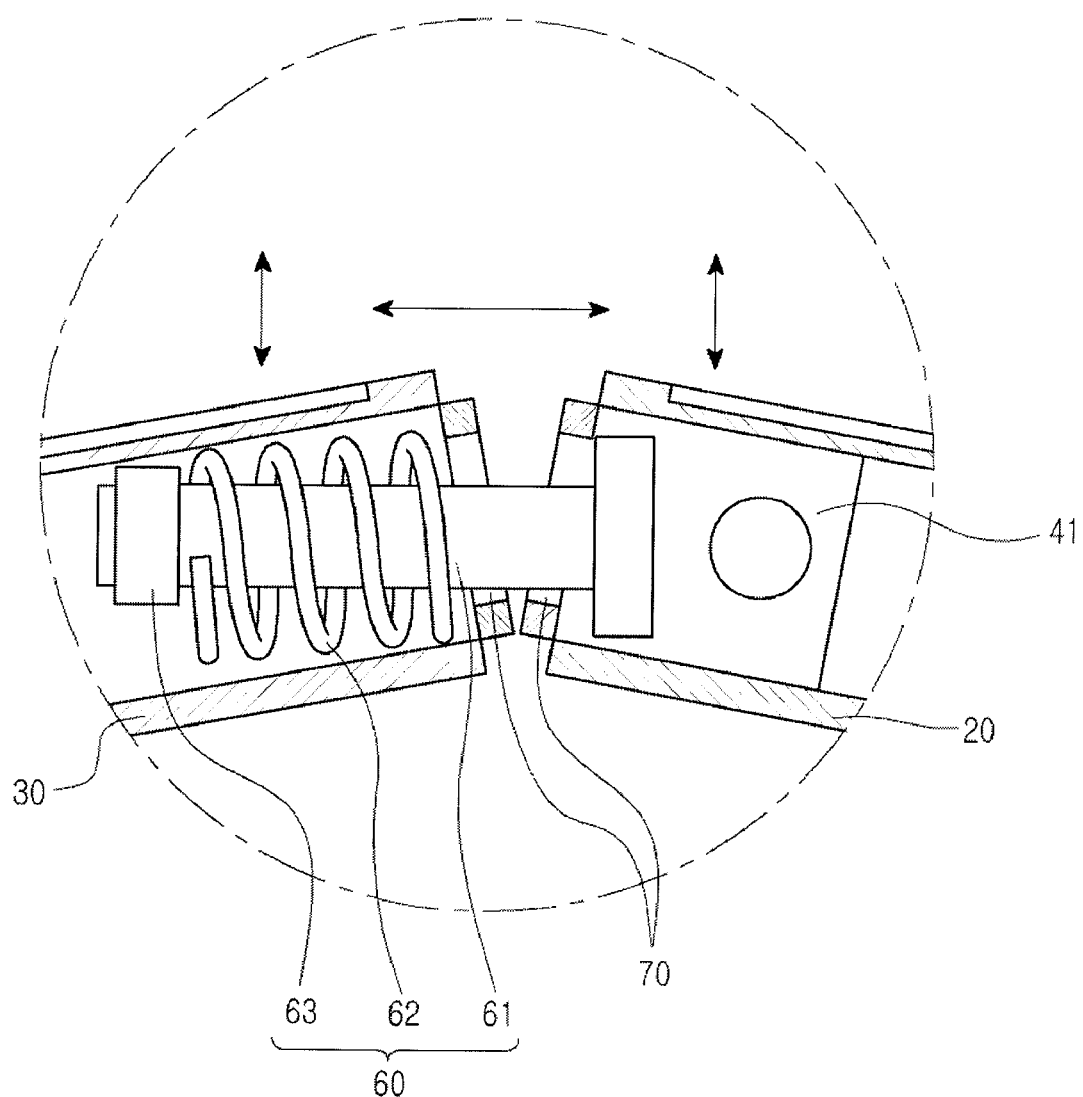
FIG. 10 is an enlarged side view of the portion "B" of FIG. 9.

As illustrated in FIGS. 3, 4 and 10, the first and second reinforcing members 40 and 50 each are provided with guide holes 70 that the connecting shafts 61 pass through. Upon bending or straightening the first and second housings 20 and 30, the guide holes 70 guide the first and second reinforcing members 40 and 50.

In the illustrated exemplary embodiment, the first and second reinforcing members 40 and 50 are U-shaped and are made of a metal material.

The operation of the reinforcing apparatus having the above construction according to an exemplary embodiment of the present invention will now be described in detail with reference to FIGS. 3 to 10.

In FIGS. 3 and 4, the mobile phone is, for example, a bar-type terminal. The reinforcing apparatus 10 of the bar-type terminal consists of the first and second reinforcing members 40 and 50 and the reinforcing connector 60.

In FIG. 5, the first and second reinforcing members 40 and 50 are coupled to each other, and the connecting shaft 61 of the reinforcing connector 60 is fastened through them. Here, the first and second reinforcing members 40 and 50 are provided with the guide holes 70 so that when the first and second reinforcing members 40 and 50 face each other, the guide holes 70 of the two reinforcing members match each other and the connecting shaft 61 passes through the matched holes. The resilient member 62 is coupled to the connecting shaft 61 that passes through the guide holes 70, and the snap ring 63 is fastened to an end of the connecting shaft 61.

Figure 6:
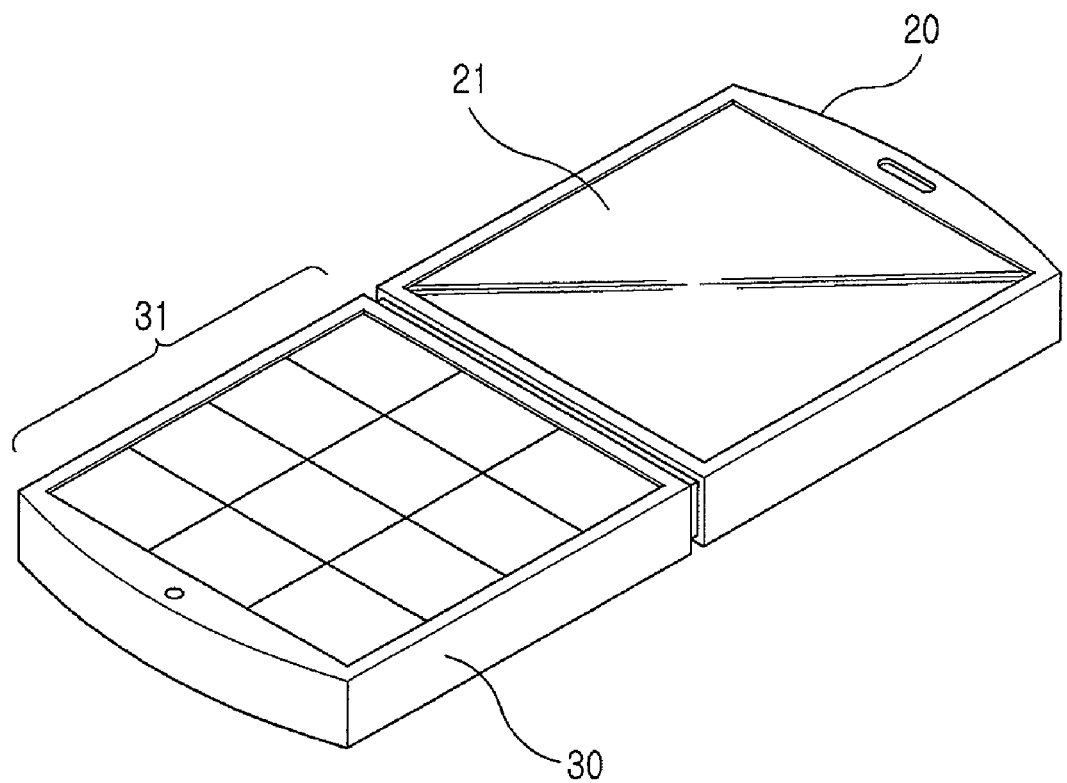
FIG. 6 is a perspective view of the mobile phone illustrated in FIG. 3, after the reinforcing apparatus is installed.
Figure 7:
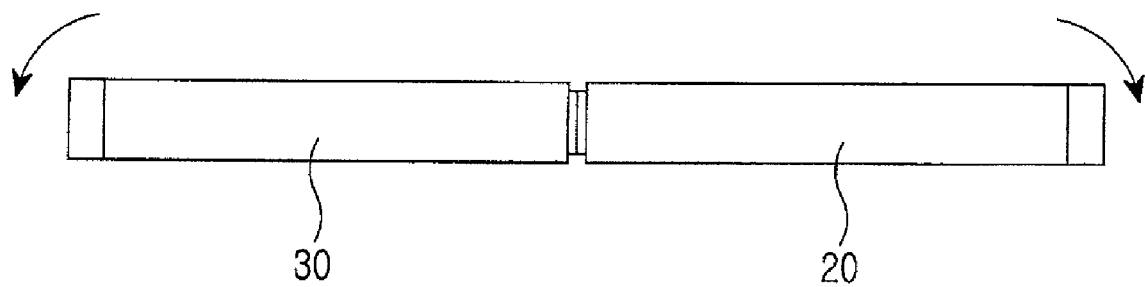
FIG. 7 is a side view of the mobile phone illustrated in FIG. 3, after the reinforcing apparatus is installed.
Figure 8:
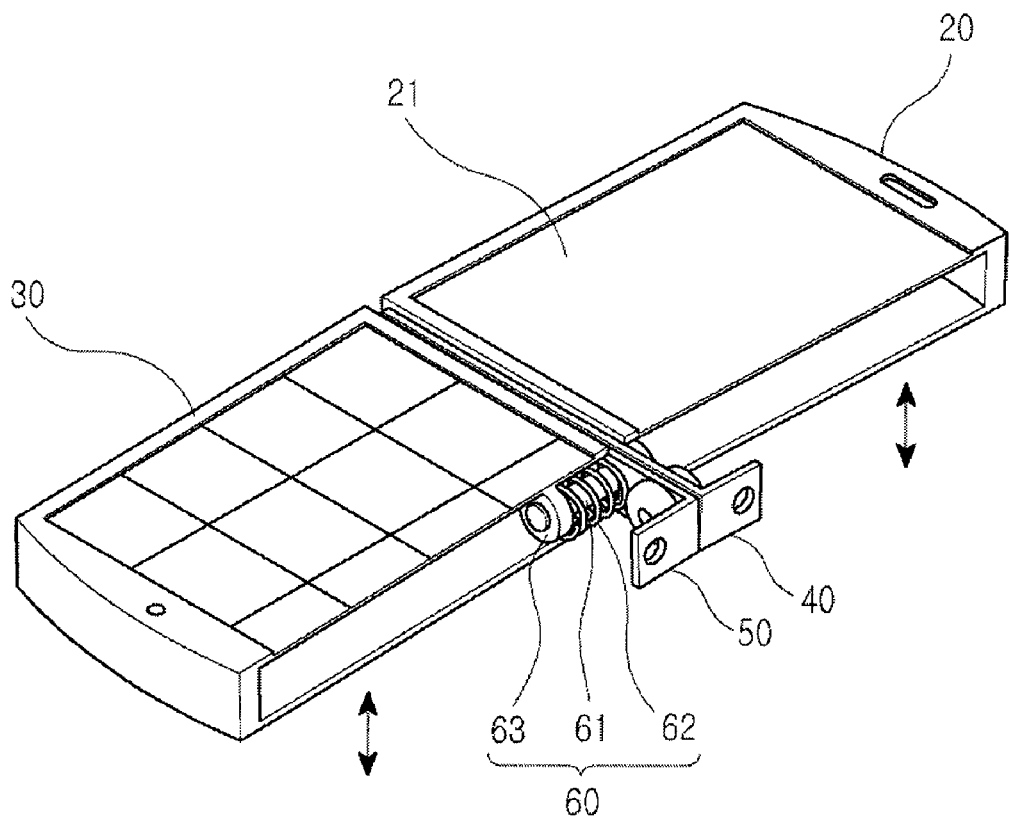
FIG. 8 is a perspective view illustrating the operation of the reinforcing apparatus for a mobile phone illustrated in FIG. 3.

In this state, as shown in FIGS. 6, 7, and 8, the first reinforcing member 40 is fastened to the first housing 20 having the LCD 21, and the second reinforcing member 50 is fastened to the second housing 30 having the key pad 31. The reinforcing members 40 and 50 are fastened to the first and second housings 20 and 30 through the fastening holes 41 and 51.

Figure 9:
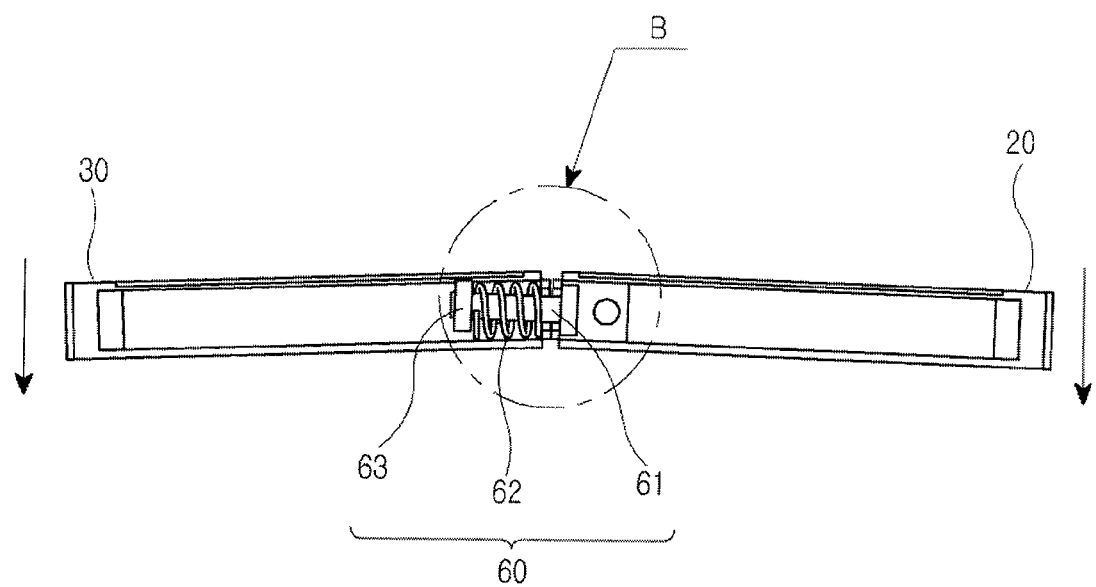
FIG. 9 is a side view illustrating the operation of the reinforcing apparatus for a mobile phone illustrated in FIG. 3.

As shown in FIGS. 8, 9, and 10, when the bar-type mobile phone is carried in a user's hand or in a user's pocket, the first and second housings 20 and 30 can be bent with respect to each other. Here, when the first and second housings 20 and 30 are bent, the first and second reinforcing members 40 and 50 are also bent.

Then, as shown in FIG. 7, when the first and second housings 20 and 30 are removed from the user's hand or pocket, the first and second housings 20 and 30 are straightened to their original positions. That is, due to the resilient force of the resilient member 62 on the connection shaft 61, the first and second reinforcing members 40 and 50 are straightened again and the first and second housings 20 and 30 are also straightened together.

In other words, as shown in FIGS. 6-10, the bar-type mobile phone extends in a generally longitudinal direction so that the first and second housings 20 and 30 are longitudinally aligned with each other. The reinforcing apparatus 10 allows the first and second housings to be bent with respect to each other to absorb impact forces and minimize potential damage. At the same time, the reinforcing apparatus 10 provides a resilient force to straighten the first and second housings (i.e., return the housings to the longitudinally aligned position) after the housings are bent.

As set forth above, the reinforcing apparatus is configured such that upon wearing the mobile phone on a user's body or in a user's pocket, the first and second housings are capable of being bent and straightened, thereby improving the use of the mobile phone, and preventing breakage through shock-absorption when the phone is dropped.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A reinforcing apparatus for a mobile phone comprising a first housing and a second housing, the reinforcing apparatus comprising:
   a first reinforcing member in the first housing;
   a second reinforcing member in the second housing; and
   a reinforcing connector to couple the first and second reinforcing members to each other so that they face each other and to connect the first and second housings so that they are capable of being bent and straightened with respect to each other, wherein the reinforcing connector provides a resilient force along a single axis to couple the first and second reinforcing members together.

2. The reinforcing apparatus according to claim 1, further comprising a pair of fastening sections on opposite ends of each of the first and second reinforcing members for fastening the reinforcing members to the first and second housings.

3. The reinforcing apparatus according to claim 1, further comprising at least one support member provided on each of the first and second reinforcing members for supporting the reinforcing members.

4. The reinforcing apparatus according to claim 1, wherein the reinforcing connector comprises:
- at least one connecting shaft that passes through the first and second reinforcing members and couples them to each other;
- a resilient member on the at least one connecting shaft to provide the resilient force to support the first and second reinforcing members and to bend or straighten the first and second housings, and
- a snap ring on the at least one connecting shaft to support the resilient member.

5. The reinforcing apparatus according to claim 4, further comprising guide holes on the first and second reinforcing members to accommodate the at least one connecting shaft and to guide the first and second reinforcing members upon bending or straightening the first and second housings.

6. The reinforcing apparatus according to claim 1, wherein the first and second reinforcing members are U-shaped.

7. The reinforcing apparatus according to claim 1, wherein the first and second reinforcing members comprise a metal material.

8. A reinforcing apparatus for a mobile phone having a plurality of housings, the apparatus comprising:
- reinforcing members in the housings; and
- a reinforcing connector to couple the reinforcing members to each other so that they face each other and to connect the housings so that the housings are capable of being bent and straightened with respect to each another, wherein the reinforcing connector provides a resilient force along a single axis to couple the reinforcing members together.

9. The reinforcing apparatus according to claim 8, wherein the reinforcing connector comprises:
- at least one connecting shaft that passes through the reinforcing members and couples the reinforcing members to each other; and
- a resilient member on the at least one connecting shaft to provide the resilient force to straighten the housings.

10. The reinforcing apparatus according to claim 9, further comprising guide holes on the reinforcing members to accommodate the at least one connecting shaft and to guide the reinforcing members upon bending or straightening the housings.

11. The reinforcing apparatus according to claim 8, wherein the reinforcing members are U-shaped.

12. A portable terminal, comprising:
- a first housing;
- a second housing substantially longitudinally aligned with the first housing;
- a first reinforcing member on the first housing, the first reinforcing member having a first guide hole;
- a second reinforcing member on the second housing, the second reinforcing member having a second guide hole; and
- a connecting shaft that passes through the first and second guide holes to connect the first and second reinforcing members so that the first and second housings are capable of being bent and straightened with respect to each other, wherein the connecting shaft passes through the first and second guide holes along a single axis.

13. The portable terminal according to claim 12, further comprising fastening sections on the first and second reinforcing members for fastening the reinforcing members to the first and second housings.

14. The portable terminal according to claim 12, further comprising at least one support member provided on the first and second reinforcing members for supporting the reinforcing members.

15. The portable terminal according to claim 12, further comprising a resilient member on the connecting shaft to provide a resilient force to bend or straighten the first and second housings.

16. The portable terminal according to claim 15, further comprising a snap ring on an end of the connecting shaft to support the resilient member.

17. The portable terminal according to claim 12, wherein the first and second reinforcing members are U-shaped.

18. The portable terminal according to claim 12, wherein the first and second reinforcing members comprise a metal material.

19. The portable terminal according to claim 12, further comprising:
- a display on an upper surface of the first housing; and
- a keypad on an upper surface of the second housing.

20. The portable terminal according to claim 12, wherein the portable terminal comprises a bar-type portable terminal.

* * * * *